Patented Dec. 15, 1970

3,547,619
NITROPHENYLACETIC ACIDS AND DERIVATIVES AS SELECTIVE HERBICIDES
Gayle E. Back, Olathe, and Norman A. Dahle, Mission, Kans., assignors to Gulf Research & Development Company, Pittsburgh, Pa., a corporation of Delaware
No Drawing. Filed Jan. 23, 1967, Ser. No. 610,746
Int. Cl. A01n 9/20, 9/24
U.S. Cl. 71—111          2 Claims

ABSTRACT OF THE DISCLOSURE

Weeds are combated by herbicidally effective amounts of isomeric nitrophenylacetic acids and with pre-emergent control, in particular, obtained by use of 2-nitrophenylacetic acid and amides and esters thereof.

SUMMARY OF INVENTION

Agricultural methods are at present undergoing revolutionary changes which feature reduction of tillage and cultivation, crowded planting of new varieties of crop plants, increased use of fertilizer and chemical control of weeds and other pests, with resulting reduction of labor and increase of yields. It has become necessary to develop new chemical weed control techniques to suit the new methods, for several reasons. Certain species of weeds now present more serious problems because they thrive on the increased application of fertilizer and less frequent cultivation. (The term "weeds" as used herein refers broadly to unwanted vegetation.) Control of weeds has become more necessary because they affect yields more seriously in crowded plantings and are a nuisance in mechanized harvesting. Chemical weed control methods must often be specially suited to the situation which exists in the field at only one particular stage of development of both crop and weeds because the farmer will only be able to make one pass through each field. Often the control technique must be aimed only at weeds which have not yet emerged, or only to those which are standing, or to a particularly noxious species. Frequently the herbicide is required to be compatible with other chemical agents which are applied simultaneously for other purposes. There is a need for a much greater variety of herbicides with varying selectivity, as well as compatibility so as to give farmers more freedom of choice of chemical weed control methods.

It has been discovered that nitrophenylacetic acids and derivatives possess selective herbicidal activity. An unpurified mixture of 2-, 3- and 4-nitrophenylacetic acids is particularly useful in overall weed control because it possesses considerable phytotoxic activity, both pre-emergent and post-emergent. The activity of the isomers is different, however; that of the 4-nitro compound being principally post-emergent, whereas both pre-emergent and post-emergent effects are exhibited by 2-nitro- and 3-nitrophenylacetic acid. Certain derivatives of these acids are more active than the acids themselves and possess useful selectivity as well. In the method of this invention one applies to the locus of the weeds a herbicidally effective amount of a compound represented by the structural formula:

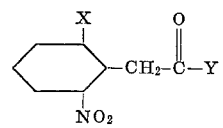

in which —X is selected from —CH$_3$, —H and —Cl and —Y is selected from the group consisting of —OH, —OCH$_3$, —OC$_2$H$_5$, —OCH$_2$CH$_2$Cl, —NH$_2$ and —NHOH. The method is particularly useful in standing crops such as oats, corn (Zea mays) and grain sorghum for pre-emergent control of weeds.

DETAILED DESCRIPTION OF INVENTION

The isomeric nitrophenylacetic acids are known. The lower alkyl esters and amides of these acids may be made by conventional procedures. However, some of the compositions which may be employed in the weed control method are novel. Laboratory procedures which may be used to prepare the novel 2-chloroethyl esters and an unusual type of N-substituted amide are presented below for purposes of illustration.

(A) Ester synthesis

Into a 100 ml. round-bottomed flask fitted with stirrer and reflux condenser was charged 9.05 g. (0.05 mole) of 2-nitrophenylacetic acid, 100 ml. of 2-chloroethanol and 3 ml. of sulfuric acid. The reaction mixture was stirred and heated to reflux temperature for 2 hours.

The reaction mixture was cooled and was extracted with two 100 ml. portions of water. The water was extracted with 100 ml. of ether. The ether extract was concentrated by evaporation and was then poured into cold hexane to precipitate the product. The product recovered from the ether extract in a total yield of 9.1 g. was 2'-chloroethyl 2-nitrophenylacetate, M.P. 58–60° C. A 2.0 gram example was recrystallized for analytical purposes (M.P. 61–62.5° C.). The results of analysis were as follows:

Calcd. for ClNO$_4$C$_{10}$H$_{10}$ (percent): Cl, 14.55; N, 5.74; O, 26.27; C, 49.30; H, 4.14. Found (percent): Cl, 14.37; N, 6.25; C, 49.65; H, 4.84.

(B) Hydroxy-amidation of an ester

A solution of 6.9 g. of hydroxylamine in 45 ml. of methanol was prepared. To this was added a solution of 8.4 g. of potassium hydroxide in 21 ml. of methanol, with cooling. This mixture was permitted to stand at room temperature for 5 minutes. To the mixture was added 11.5 g. of ethyl 2-nitrophenylacetate dissolved in 40 ml. of methanol. The mixture was then filtered and was allowed to stand for 24 hours, at which time the methanol was evaporated under reduced pressure. The oily residue was then taken up in aqueous acetic acid, was cooled and filtered, yielding 3.7 g. of N-hydroxy-2-nitrophenylacetamide, M.P. 160–161° C. (dec.). A portion was purified by extraction with ether to yield a product which melted at 175–175.5° C. with decomposition. Analytical results on the purified sample were as follows:

Calcd. for $N_2O_4C_8H_8$ (percent): C, 48.98; H, 4.11; N, 14.28; O, 32.62. Found (percent): C, 48.72; H, 3.99; N, 14.88.

(C) Demonstration of herbicidal characteristics

Post-emergent herbicidal activity was demonstrated by means of the following procedure:

An aqueous dispersion of the compound being tested was prepared in each instance by combining 0.4 gram of the compound with about 4 ml. of a solvent-emulsifier mixture (3 parts of a commercial polyoxyethylated vegetable oil emulsifier, one part xylene, one part kerosene) and then adding water, with stirring, to a final volume of 40 ml.

The species of plants on which each compound was to be tested were planted in four-inch pots in the greenhouse. Ten to eighteen days after emergence of the plants, three pots were sprayed with each aqueous dispersion prepared as above at the rate of 5 pounds of the active chemical per acre and at a spray volume of 60 gallons per acre. Approximately one week after the spray application the plants were observed and the results were rated according to the following schedule:

Type of action

C—chlorosis (bleaching)
N—necrosis
G—growth inhibition
F—formative effect (abnormal form of growth)
K—non-emergence Degree 0—no effect
1—slight effect
2—moderate effect
3—severe effect
4—maximum effect (all plants died).

Pre-emergent herbicidal activity was evaluated by means of the following procedure:

A solution was prepared by dissolving 290 mg. of the compound to be tested in 200 ml. of acetone. Disposable paper half-flats were prepared and seeded, then sprayed with the acetone solution at the rate of 20 pounds of active chemical per acre of sprayed area. One flat, which had been seeded with alfalfa, brome, flax, oats, radishes and sugar beets was held at 75° F. day temperature; another seeded with corn, coxcomb, cotton, crabgrass, millet and soybeans was held at 85° F. Twenty-one days after seeding and treatment the flats were examined and plant emergence and effects on growth were rated according to the schedule set forth above.

Following are tabulated the results of tests according to the above procedures on a representative group of compounds which are suitable for use in the weed control method. Although the data presented are for each compound used by itself, it will be understood that mixtures may be employed so as to obtain desirable combinations of herbicidal properties. These herbicides, particularly the esters, also possess compatibility with other classes of herbicidal and pesticidal compounds so that they may be used in multiple purpose formulations.

| Structure | Type | Crabgrass | Coxcomb | Brome | Millet | Soybean | Cotton | Alfalfa | Oats | Corn | Flax | Radish | Sugar Beet | Wheat | Grain Sorghum | Tomato |
|---|---|---|---|---|---|---|---|---|---|---|---|---|---|---|---|---|
| $CH_2$—COOC$_2$H$_5$ / phenyl-NO$_2$ | Post | | | | F1 | F1 | F3 N1 | N2 F2 | 0 | 0 | F2 N2 | F1 | N1 F1 | 0 | | F1 |
| | Pre | K4 | | G2 K1 | K4 | K4 | K4 | K4 | G1 | G2 | K4 | K4 | K4 | | | |
| $CH_2$—C—NHOH / phenyl-NO$_2$ | Post | | | | 0 | F1 | F3 G1 | F2 G2 | 0 | 0 | F1 | F1 | G1 N1 | N1 | 0 | F2 G2 |
| | Pre | K4 | | G2 | F3 G3 | K4 | K4 | K4 | G1 | G2 | K4 | K4 | K4 | | | |
| $CH_2$—C—O—CH$_2$CH$_2$Cl / phenyl-NO$_2$ | Post | | | | G2 F2 | G2 F2 | G3 F3 | G3 F3 | F1 | G1 F1 | F1 | G3 F3 | G3 N1 | F1 | 0 | G1 F1 |
| | Pre | K4 | K3 G3 | G3 | K4 | K4 | K4 | K4 | G3 | G2 | N4 | K4 | K4 | | | |
| $CH_2$—COOCH$_3$ / phenyl-NO$_2$ | Post | | | | G2 F2 | G1 F1 | G3 F3 | G3 F2 | F1 | G1 F1 | F1 | G2 F2 | G3 F3 | F1 | 0 | G1 F1 |
| | Pre | K4 | K3 G3 | K3 G3 | K4 | K4 | K4 | K4 | G2 | G2 | N4 | K4 | K4 | | | |

| Structure | Type | Crabgrass | Coxcomb | Brome | Millet | Soybean | Cotton | Alfalfa | Oats | Corn | Flax | Radish | Sugar Beet | Wheat | Grain Sorghum | Tomato |
|---|---|---|---|---|---|---|---|---|---|---|---|---|---|---|---|---|
| ![structure: 2-NO2 benzyl-O-CH2COH] | Post | | | | G2 F2 | G1 F1 | G3 F3 | G3 F2 | F1 | G1 F1 | N4 | G3 F3 | G3 F3 | F1 | 0 | F1 |
| | Pre | {K3 G3} | K4 | G3 | K3 G3 | K3 G3 | K3 G3 | K4 | G2 | G2 | K3 G3 | K3 G3 | K3 G3 | | | G1 |
| ![structure: 4-O2N benzyl-O-CH2COH] | Post | | | | | N1 G1 | N4 | N4 | | N4 | N2 G2 | N4 | N4 | N2 G1 | N2 G2 | N4 |
| | Pre | 0 | 0 | 0 | N1 G1 | 0 | 0 | 0 | 0 | 0 | 0 | 0 | 0 | 0 | 0 | 0 |
| ![structure: 2-Cl,5-NO2 benzyl-O-CH2COOC2H5] | Post | | K4 | G3 | 0 | N2 G1 | N4 | N1 G1 | 0 | 0 | N4 | N1 G1 | N1 G1 | 0 | 0 | N1 G1 |
| | Pre | {K4 G3} | 0 | | K4 | K4 | K4 | K4 | G2 | G2 | K4 | K4 | K4 | 0 | 0 | 0 |
| ![structure: 2-Cl,5-NO2 benzyl-O-CH2-H2] | Post | | | | 0 | 0 | 0 | 0 | 0 | 0 | K3 G3 | 0 | 0 | 0 | 0 | 0 |
| | Pre | {K3 G3} | K4 | G3 | G3 | K4 | K4 | K4 | G2 | G2 | K4 | K4 | K4 | 0 | 0 | N4 |
| ![structure: 2-Cl,5-NO2 benzyl-O-CH2COH] | Post | | | | 0 | 0 | N4 | N4 | 0 | 0 | N4 | 0 | 0 | 0 | 0 | N4 |
| | Pre | {K3 G3} | K4 | G2 | G3 | K4 | K4 | K4 | G2 | G1 | K4 | K4 | K4 | 0 | 0 | 0 |
| ![structure: 3-NO2 benzyl-O-CH2COH] | Post | | | | 0 | 0 | F3 G3 | N4 | N1 | N3 G3 | N4 | N1 G1 | N4 | 0 | N1 | N4 |
| | Pre | {K3 G3} | K4 | G3 | K3 G3 | G3 | K4 | K4 | G2 | G1 | K4 | K4 | K4 | 0 | 0 | 0 |
| ![structure: 4-NO2, CH3 benzyl-O-CH2COOH] | Post | | | | 0 | N2 G2 | N3 G3 | N1 | G2 | G1 | N4 | K4 | K4 | 0 | 0 | N1 G1 |
| | Pre | {K3 G3} | K4 | G3 | K3 G3 | K3 G3 | K4 | K4 | G2 | G1 | K4 | K4 | K4 | 0 | 0 | G1 |
| ![structure: 3-NO2, CH3 benzyl-O-CH2COOC2H5] | Post | | | | 0 | N1 | F3 G3 | N1 | 0 | 0 | N1 | N1 | N1 G1 | 0 | 0 | F2 N2 G2 |
| | Pre | {K3 G3} | K4 | G3 | K3 G3 | K3 G3 | K4 | K4 | G2 | G1 | K3 G3 | K4 | K3 G3 | 0 | 0 | |

What is claimed is:

1. The method of combating weeds which comprises applying pre-emergently to the locus of the weeds a herbicidally effective amount of N - hydroxy - 2 - nitrophenylacetamide.

2. The method of combating weeds which comprises applying pre-emergently to the locus of the weeds a herbicidally effective amount of 2'-chloroethyl 2-nitrophenylacetate.

References Cited

UNITED STATES PATENTS

| | | | |
|---|---|---|---|
| 3,009,806 | 11/1961 | Weil | 71—115 |
| 2,394,916 | 2/1946 | Jones | 71—107 |
| 2,341,868 | 2/1944 | Hitchcock et al. | 71—107 |

OTHER REFERENCES

"Relation Between Molecular Structure and Physiological Activity of Plant Growth Regulators," Weintraub et al. Chem. Abs. vol. 46 (1952), 5773g.

"m-Nitro and m-Trifluoromethylaryl Acids as Plant Growth Regulators," Takeda. Chem. Abs. vol. 53 (1959), 20641f.

"First Contribution to the Knowledge of the Cytological and Physiological Activity of Growth Substances in Allium Cepsa," D'Amato et al. Chem. Abs. vol. 45 (1951), 6247h.

LEWIS GOTTS, Primary Examiner

C. L. MILLS, Assistant Examiner

U.S. Cl. X.R.

71—115, 118; 260—471, 515, 558